(12) United States Patent
Kawamoto et al.

(10) Patent No.: US 8,036,652 B2
(45) Date of Patent: Oct. 11, 2011

(54) RADIO ACCESS POINT TESTING APPARATUS

(75) Inventors: Kiyoshi Kawamoto, Yokohama (JP); Akihiko Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/049,201

(22) Filed: Mar. 16, 2011

(65) Prior Publication Data
US 2011/0164524 A1 Jul. 7, 2011

Related U.S. Application Data

(63) Continuation of application No. 11/758,088, filed on Jun. 5, 2007, now abandoned.

(30) Foreign Application Priority Data

Jun. 9, 2006 (JP) .................................. 2006-160862

(51) Int. Cl.
*H04L 12/26* (2006.01)
*H04B 17/00* (2006.01)

(52) U.S. Cl. ...................... 455/423; 455/67.13; 370/242

(58) Field of Classification Search .................... 455/67, 455/115, 226, 423–426; 379/1.01–35; 370/241–253
See application file for complete search history.

(56) References Cited

U.S. PATENT DOCUMENTS

| 5,742,589 | A | * | 4/1998 | Murata | .......................... | 370/249 |
| 6,094,577 | A | | 7/2000 | Han | | |
| 6,154,638 | A | | 11/2000 | Cheng et al. | | |
| 6,175,747 | B1 | * | 1/2001 | Tanishima et al. | ......... | 455/562.1 |
| 6,185,431 | B1 | * | 2/2001 | Li et al. | .......................... | 455/522 |
| 2004/0198235 | A1 | | 10/2004 | Sano | | |
| 2005/0107080 | A1 | * | 5/2005 | Hasegawa et al. | ............ | 455/423 |
| 2006/0211427 | A1 | * | 9/2006 | Azman et al. | ................. | 455/423 |
| 2006/0234749 | A1 | * | 10/2006 | Morrison et al. | ............. | 455/522 |

FOREIGN PATENT DOCUMENTS

| CN | 1550075 | 11/2004 |
| JP | 11-154903 | 6/1999 |
| JP | 11-298423 | 10/1999 |
| JP | 2002-271280 | 9/2002 |
| JP | 2005-151189 | 6/2005 |
| JP | 2006-128913 | 5/2006 |

OTHER PUBLICATIONS

3GPP2 C.S0024-A v2.0, MAC Layer, C.S. 0024 -> 10.4.6.1. 3GPP2 C.S0024-A v2.0, MAC Layer, C.S. 0024 -> 10.5.6.1.
3GPP2 C.S0024-A v2.0, Default (Subtype 0) and Subtype 1 Physical Layer, C.S. 0024 -> 12.2.1.
3GPP2 C.S0024-A v2.0, SUBTYPE 2 Physical Layer, C.S. 0024 -> 13.2.1 & 13.2.2.

* cited by examiner

*Primary Examiner* — Kent Chang
*Assistant Examiner* — Kashif Siddiqui
(74) *Attorney, Agent, or Firm* — Antonelli, Terry, Stout & Kraus, LLP.

(57) ABSTRACT

In a case where reception power in a radio access point is high by external noise, the normalcy of the radio access point is tested. In order to judge the normalcy of the radio characteristic of the radio access point, a test is performed through the calling connection between a testing access terminal in the radio access point and a predetermined device. An RSSI is measured before and after the transmission of a test signal. When the RSSI exceeds a threshold value, the path loss of a reverse link connected from the radio access point to the testing access terminal is increased by an attenuator. Then, reception power in the testing access terminal decreases. Thus, initial transmission power in accordance with the reception power from the testing access terminal is raised and the calling connection of the testing access terminal can be performed even under the external noise.

9 Claims, 4 Drawing Sheets

RADIO ACCESS POINT TESTING APPARATUS

CROSS REFERENCE TO RELATED APPLICATION

This is a continuation of U.S. application Ser. No. 11/758,088, filed Jun. 5, 2007 now abandoned. This application relates to and claims priority from Japanese Patent Application No. 2006-160862, filed on Jun. 9, 2006. The entirety of the contents and subject matter of all of the above is incorporated herein by reference.

BACKGROUND OF THE INVENTION

The present invention relates to a radio access point testing apparatus, and more particularly to a radio access point testing apparatus which confirms the normalcy of the radio characteristic of a radio access point in an environment where interfering waves such as external noise mix into the radio access point in a mobile communication system employing a CDMA format.

In servicing the mobile communication system, the stability of the system is one of important factors. For the stable operation of the system, it is required to prevent the occurrence of any failure leading to a system service shutdown, and also to promptly detect the failure and resume the system operation in case of the occurrence of the failure. Accordingly, the failure detection of the radio access point and a diagnostic scheme therefor are very important.

As an example of a method for diagnosing the normalcy of the radio access point, JP-A-2002-271280 (Patent Document 1) discloses a method wherein the normalcy of the radio access point is judged in such a way that packet data are transmitted from a maintenance terminal through the Internet to an access terminal which is connected in branch from the antenna of the radio access point, and that a reply from the access terminal is confirmed.

This method is really capable of detecting such an abnormalcy as the complete cutoff of a main signal line in the radio access point apparatus, but it is difficult of detecting such a trifling abnormal state as some degradation in the radio characteristic.

A transmitter and a receiver are mounted in the radio access point. Regarding the failure of the transmitter of them, the degradation of the radio characteristic can be detected comparatively easily by monitoring signal power in a reverse link (in a direction from the access point toward the access terminal). In a forward link (in a direction from the access terminal toward the access point), however, the level of the signal power in a normal condition sometimes becomes a level lower than thermal noise, especially in case of employing the CDMA as a radio communication format, so that the abnormal state is difficult of detection even when the radio characteristic has somewhat degraded.

As a method for solving this problem, a method capable of detecting the abnormal state is disclosed in JP-A-2005-151189 (Patent Document 2). More specifically, a testing access terminal is connected in branch from the antenna port of the radio access point. The testing access terminal controls transmission power so that the packet error rate of sent packets may become constant, and it confirms the transmission power of this testing access terminal at the time when the packet error rate has fallen within a predetermined range. Thus, even when the degradation of the radio characteristic has occurred, the detection of the abnormal state is possible. By way of example, if the transmission power of the testing access terminal is high, degradation in the reception sensitivity of the radio access point is judged.

SUMMARY OF THE INVENTION

Even with the method disclosed in Patent Document 2, however, the transmission power of the packets which are sent from the testing access terminal is controlled to be steadily high, in such a case where interference waves from any other system arrive in an environment in which the access point is located, or where the number of terminals which are connected is large, so that received power (RSSI: Received Signal Strength Indicator) in the forward link is steadily high. On this occasion, it is difficult to discriminate whether the high transmission power is influenced by the external noise or is caused by the radio characteristic degradation of the access point.

In consideration of the convenience of a maintenance engineer side, the normalcy confirming test of the radio access point should preferably be executable while the service of a radio system is held continued. In this case, power from the general terminals lying within a pertinent cell and interference power from the other system enter the forward link as stated above. Therefore, it is very possible that the RSSI in the forward link will heighten temporarily or steadily. In the case where the access point normalcy confirming test which employs the testing terminal is carried out in the state of the high RSSI, problems to be mentioned below are considered by way of example.

As one of the problems (the first problem), the test might fail in a calling connection for the reason that an originating signal from the testing terminal does not reach the access point.

By way of example, there will be described a transmission power control scheme for an access terminal, in "1× EV-DO" (short for "1× Evolution Data Only", and refer to, for example, 3GPP2 C. S. 0024 (Non-Patent Document 1) in detail) which is one of schemes put to practical use as a third-generation portable phone system. In the 1× EV-DO scheme, the initial transmission power of the access terminal is determined by the strength of a reverse signal transmitted from the access point, in the access terminal. By way of example, if the reception power of the reverse signal in the access terminal is high, it is judged that the access terminal lies at a position near the access point, and the initial transmission power in the access terminal is controlled to a low level. On the other hand, if the reception power in the access terminal is low, it is judged that the access terminal is far from the access point, and the initial transmission power in the access terminal is controlled to a high level. This control is called the "Open Loop Power Control", and it is extensively used for the determination of the initial transmission power in the access terminal, in the mobile system employing the CDMA format. The initial transmission power (Xo) of the access terminal in the 1× EV-DO scheme is calculated by the following formula:

$$Xo = -\text{Mean Rx Power (dBm)} + \text{Open Loop Adjust (dB)} + \text{Probe Initial Adjust (dB)} \quad (1)$$

Here, the "Mean Rx Power" denotes mean reception power in the access terminal. The "Open Loop Adjust" and "Probe Initial Adjust" are system parameters for adjusting the initial power, and since both the parameters are uniquely determined by the system, they cannot be adjusted every terminal. By way of example, the initial transmission power (Xo) mentioned above is used as the transmission power from the access terminal till the calling connection.

More specifically, since the initial transmission power of the access terminal is determined by the signal power of a reverse link, the state of a forward link is not considered at all. Therefore, when the RSSI in the access point is high in the forward link on account of the interference waves from the other system, the transmission power from the general terminals, or the like, the initial transmission power from the testing access terminal is excessively low relative to the RSSI, and the access point normalcy confirming test fails in the calling connection in some cases. When the calling connection from the testing access terminal ends in failure, the access point normalcy confirming test ends in failure, and hence, an abnormal state is decided by way of example. It is difficult, however, to judge whether the decided abnormal state is ascribable to the external noise or to any abnormalcy of the access point apparatus. It is accordingly necessary to take a countermeasure which prevents the failure in the calling connection from the testing terminal, even under the environment where such influence of the external noise is considered.

Even when the calling connection has been successful, the other problem (the second problem) is involved in case of employing the method stated in Patent Document 2. In the method, in order to confirm the normalcy of the radio characteristic of the forward link of the radio access point, the reception sensitivity in the radio access point is measured on the basis of the transmission power from the testing terminal as satisfies the desired packet error rate in the forward link, and the normalcy of the reception sensitivity in the radio access point is judged. In this case, a normal decision result cannot be obtained, similarly under the environment where the RSSI of the forward link is high.

Concretely, let's suppose a state where the RSSI of the forward link is, for example, 10 dB higher than in an environment in which quite no external noise exists. In a case where the reception sensitivity measurement has been performed by the testing access terminal in the state, the transmission power of the testing access terminal is controlled to be higher in correspondence with the rise (10 dB) of the RSSI of the forward link, in order to attain the desired packet error rate. As the result of the reception sensitivity test, therefore, the reception sensitivity of the radio access point seems to have degraded 10 dB. Also here, it is difficult to judge whether the abnormal state is ascribable to the external noise or to any abnormalcy of the access point apparatus. It is accordingly necessary to take a countermeasure which prevents influence on the result of the radio characteristic confirming test, even under the environment where such influence of the external noise is considered.

In view of the above points, the present invention has for its object to provide a radio access point testing apparatus which excludes the influence of external noise, and which can carry out the normalcy confirming test of a radio access point even under an environment where the external noise exists. Another object of the invention is to carry out a test normally without the influence of external noise on a test result. Still another object of the invention is to specify any abnormal test result as being ascribable to the abnormalcy of the side of a radio access point apparatus, not to the influence of external noise.

First, one means for resolution (first means) in the case where a calling connection ends in failure under the influence of external noise, as one of the problems (the first problem), will be explained below.

The reason why the calling connection might end in the failure when reception power RSSI in a forward link has heightened under the influence of external noise or the like, is that, as stated before by way of example, the initial transmission power of an originating signal transmitted from an access terminal (a general access terminal or a testing access terminal) is determined by the strength of signal power in a reverse link, without considering the state of a forward link. Therefore, when the calling connection is performed in the state where the RSSI of the forward link has heightened, the transmission power from the testing access terminal might fail to reach a radio access point.

As one means for solving this problem (first means), the RSSI of the forward link is always monitored in the receiver of the radio access point. In a case where the rise of the monitored RSSI from RSSI in a state in which the external noise is nonexistent exceeds a threshold value, a path loss in the signal path of the reverse link as is fed to the testing access terminal is increased by a quantity corresponding to the rise of the RSSI of the forward link. In a case where a forward signal has not reached the access point, the access terminal repeats retries by raising the power about 10 to 20 dB ordinarily. Therefore, the threshold value can be set at approximately 5 to 10 dB. Thus, the path loss of the reverse link increases, whereby the reception power of the reverse link in the testing access terminal lowers. As a result, the initial transmission power (Xo) of the testing access terminal evaluated by Formula (1) mentioned before increases by the decrease in the reception power of the reverse link. Accordingly, the radio wave of the testing access terminal can be caused to reach the receiver of the radio access point, against the influence of the external noise, and the calling connection can be performed.

As the other means (second means) for solving the first problem, the access terminal of a general user calculates the initial transmission power by Formula (1) mentioned before, whereas the initial transmission power of the testing access terminal is not evaluated by Formula (1), but it is given as a fixed value which is the optimum value evaluated from the path loss between the radio access point and the testing access terminal. Since the path loss between the testing access terminal and the radio access point does not change with time, this means can be adopted. Besides, on this occasion, in a case where the RSSI (X) of the forward link has risen to exceed a threshold value, on account of the external noise or the like, the initial transmission power (Xo) given as the fixed value is raised by an offset component ($\Delta X$) corresponding to the rise of the RSSI of the forward link (to Xo+$\Delta X$), whereby the initial transmission power is adjusted. Likewise to the first means explained above, the radio wave of the testing access terminal can be caused to reach the radio access point, against the influence of the external noise, and the calling connection can be performed.

Next, means (first means) for avoiding the influence of the external noise in the case where the normalcy of the radio characteristic of the forward link is confirmed, the influence forming the other problem (the second problem), will be explained below.

The reason why the external noise exerts the influence on the normalcy confirming test of the radio characteristic of the forward link, is that the transmission power of the testing access terminal for satisfying the desired packet error rate rises when the RSSI of the forward link rises. The problem on this occasion is that whether the rise of the transmission power of the testing access terminal is ascribable to the influence of the external noise or to the abnormalcy of the radio access point apparatus cannot be judged.

One (first means) of the means for solving the problem is a method in which the normalcy of the radio characteristic is not decided by the absolute value of the transmission power of the testing access terminal, but it is evaluated by the ratio (relative value) between the RSSI of the forward link measured in the radio access point and a value (reception sensitivity level) obtained by calculating the transmission power of the testing access terminal into the power of the antenna end of the radio access point. A formula for deciding the normalcy of the radio characteristic in this case is as follows:

$$\text{Reception sensitivity level (dBm)} - \text{RSSI (dBm)} < \text{Threshold value (dB)} \quad (2)$$

Thus, even in such a case where the RSSI of the forward link has risen due to the external noise or the like, the normalcy of the radio characteristic can be confirmed.

By the way, in the case where this method is employed, it should more preferably be guaranteed that the value of the RSSI of the forward link as has been measured in the radio access point is correct. The reason therefor is as stated below. The measured RSSI can indicate a value higher than an actual value on account of the abnormalcy of the radio access point apparatus, especially the RSSI measurement circuit portion thereof. Nevertheless, even when the reception sensitivity level has somewhat risen on account of such an abnormalcy of the radio access point apparatus, it might be misdecided that the measurement value of the RSSI has risen by above the rise of the reception sensitivity level, so the radio access point apparatus is normal.

In order to avoid this problem, there is disposed means for transmitting a signal at known fixed transmission power from the testing access terminal, so as to confirm that the measurement result of the RSSI measured in the radio access point is correct. In this case, the set value of the fixed transmission power is set at a level which is sufficiently higher than the rise of the RSSI attributed to the external noise, whereby the influence of the external noise exerted on the RSSI measurement value in the radio access point can be neglected. Besides, the fixed transmission power from the testing access terminal is inputted to the receiver-0 and receiver-1 of the radio access point independently of each other, whereby the influence on a service under operation is suppressed to the minimum.

The other means (second means) for solving the second problem is to superpose white noise on a signal from the testing access terminal, whereby the test signal is fed to the radio access point as a signal which, in itself, holds a certain CIR (Carrier to Interference Ratio), and this test signal is set at a sufficiently high level relative to the external noise. With this method, the white noise of known level can be employed, so that the reception quality of the test signal from the testing access terminal can be calculated more precisely than in the first resolution means stated above. The CIR of the test signal is determined by the ratio between the level of the white noise and the transmission level of the test signal, and it is adjusted to a value which is required for satisfying a desired PER and which does not have a very wide margin. Thus, in a case where the degradation of the radio characteristic has occurred due to any hardware failure, it appears as the degradation of a PER in the forward link, and hence, the abnormalcy of the radio characteristic can be decided.

According to the first solving means of this invention, there is provided a radio access point testing apparatus, comprising:

a terminal function portion which has a transmission function and a reception function of a communication terminal in a radio communication system, and an initial transmission power from the terminal function portion in case of performing a calling connection is determined in accordance with reception power;

a radio processing unit which includes a transmitter for transmitting signals to said terminal function portion and the communication terminal, a receiver for receiving signals from said terminal function portion and the communication terminal, and a measurement part for measuring reception power in said receiver as includes power of the radio signal from the communication terminal and/or interference waves;

an attenuator which adjusts a path loss between said transmitter and said terminal function portion; and a control unit which performs the calling connection between said terminal function portion and a predetermined device, through said radio processing unit, so as to test normalcy and abnormalcy of a radio access point;

wherein said attenuator increases the path loss in accordance with a value of the reception power measured in said measurement part, thereby to decrease the reception power in said terminal function portion and to consequently increase the initial transmission power;

said terminal function portion performs the calling connection with the predetermined device by the increased initial transmission power; and said control unit performs the test of the radio access point.

According to the second solving means of this invention, there is provided a radio access point testing apparatus, comprising:

a terminal function portion which has a transmission function and a reception function of a communication terminal in a radio communication system, and an initial transmission power in case of performing a calling connection is previously set;

a radio processing unit which includes a transmitter for transmitting signals to said terminal function portion and the communication terminal, a receiver for receiving signals from said terminal function portion and the communication terminal, and a measurement part for measuring reception power in said receiver as includes power of the radio signal from the communication terminal and/or interference waves; and a control unit which performs the calling connection between said terminal function portion and a predetermined device, through said radio processing unit, so as to test normalcy and abnormalcy of a radio access point;

wherein said terminal function portion increases the set initial transmission power in accordance with a value of the reception power measured by said measurement part;

said terminal function portion performs the calling connection with the predetermined device by the increased initial transmission power; and said control unit performs the test of the radio access point.

According to the third solving means of this invention, there is provided a radio access point testing apparatus, comprising:

a terminal function portion which has a transmission function and a reception function of a communication terminal in a radio communication system;

a radio processing unit which includes a transmitter for transmitting signals to said terminal function portion and the communication terminal, a receiver for receiving signals from said terminal function portion and the communication terminal, and a measurement part for measuring reception power in said receiver as includes power of the radio signal from the communication terminal and/or interference waves; and a control unit which performs a calling connection between said terminal function portion and a predetermined device, through said radio processing unit, so as to test normalcy and abnormalcy of a radio access point;

wherein said control unit obtains a difference between a value of the reception power measured by said measurement part and transmission power of said terminal function portion adjusted so as to satisfy a desired packet error rate in said radio processing unit, and compares the obtained difference and a predetermined threshold value, thereby to judge the normalcy of the radio access point.

According to the forth solving means of this invention, there is provided a radio access point testing apparatus, comprising:

a terminal function portion which has a transmission function and a reception function of a communication terminal in a radio communication system;

a radio processing unit which includes a transmitter for transmitting signals to said terminal function portion and the communication terminal, a receiver for receiving signals from said terminal function portion and the communication terminal, and a measurement part for measuring reception power in said receiver as includes power of the radio signal from the communication terminal and/or interference waves;

a control unit which performs a calling connection between said terminal function portion and a predetermined device, through said radio processing unit, so as to test normalcy and abnormalcy of a radio access point;

a noise generation portion which generates noise; and a combiner which generates a test signal by superposing the noise from said noise generation portion, on a signal outputted from said terminal function portion, and which outputs the test signal to said radio processing unit;

wherein said terminal function portion adjusts the transmission power so as to satisfy a desired packet error rate or signal-to-noise ratio; and the transmission power from said terminal function portion is set at power which is higher than the reception power measured by said measurement part or external noise, by superposing the noise.

According to the present invention, it can provide a radio access point testing apparatus which excludes the influence of external noise, and which can carry out the normalcy confirming test of a radio access point even under an environment where the external noise exists. According to the present invention, it can carry out a test normally without the influence of external noise on a test result. Still another object of the invention is to specify any abnormal test result as being ascribable to the abnormalcy of the side of a radio access point apparatus, not to the influence of external noise.

DESCRIPTION OF THE PREFERRED
EMBODIMENTS OF THE INVENTION

1. First Embodiment (System Configuration)

The configurations and operating methods of a radio access point apparatus and a radio communication network according to this embodiment will be described in detail by taking a 1× EV-DO (1× Evolution Data Only) system as an example.

Figure 1:
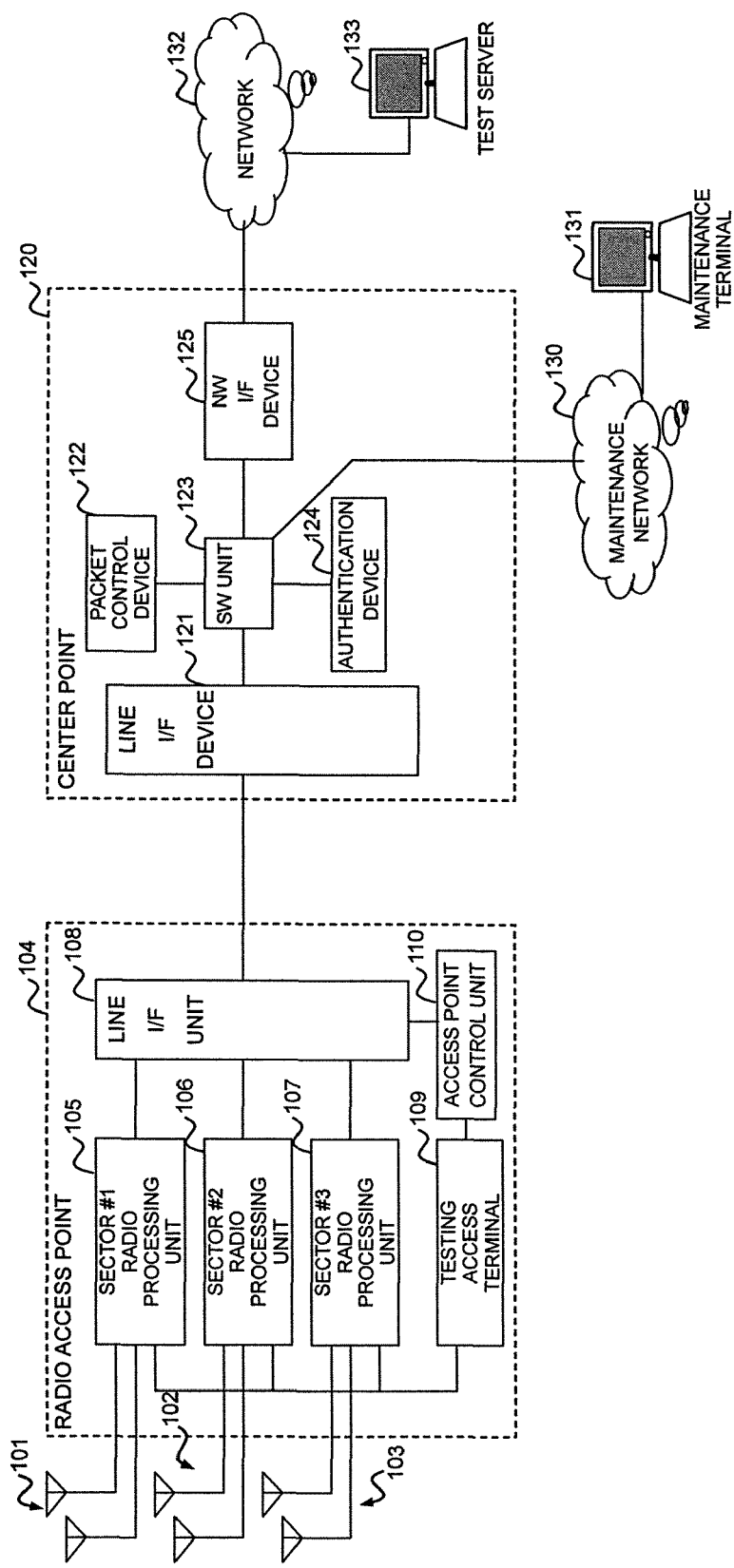
FIG. 1 is a diagram showing the configuration of a radio access point testing system in an embodiment of the present invention.

FIG. 1 is a configurational diagram of a radio access point testing system in the 1× EV-DO system.

The radio access point testing system includes a radio access point to-be-tested (radio access point testing apparatus) 104, a center point facility 120, a test server 133 which is connected to a network 132, and a maintenance terminal 131 which monitors the radio access point 104 and the center point facility 120. The radio access point 104 takes a three-sector configuration in this example, and it includes radio processing units 105-107 corresponding to respective sectors, a line interface (I/F) unit 108, a testing access terminal (testing terminal) 109, and an access point control unit 110. The center point facility 120 includes a line I/F device 121 which accommodates the radio access point 104, a switch (SW) unit 123 which performs the routing of packets, a packet control device 122 which performs a packet control and a session management, a authentication device 124 which executes a terminal authentication (verification) process, and a network interface (NW I/F) device 125 which performs connection with the Internet. Incidentally, a plurality of radio access points 104 can also be disposed, and the individual radio access points 104 can be respectively connected to the center point 120.

The maintenance terminal 131 is connected to the access point 104 via a maintenance network 130, and it has the function of remotely monitoring and controlling the radio access point 104. The test server 133 is, for example, a testing server, and a terminal function portion within the testing access terminal 109 is connected to the test server 133 via the network 132. Incidentally, any appropriate server may be employed as the testing server.

The normalcy of the radio access point 104 is confirmed by employing, for example, the testing access terminal 109 mounted in the radio access point 104, and transmitting and receiving test packets between this access terminal 109 and the test server 133. The instruction of a test is given in such a way that the sector to be tested is sent from the maintenance terminal 131 to the access point control unit 110 of the radio access point 104. Upon receiving the test instruction from the maintenance terminal 131, the access point control unit 110 instructs the testing access terminal 109 to transmit test data to the specified sector. The testing access terminal 109 performs a calling connection with the test server 133 through the specified one of the sectors 105-107. After the completion of the calling connection, the testing access terminal 109 transmits the test data to the test server 133 so as to perform the normalcy confirming test of the access point 104. Incidentally, the processing example of the normalcy confirming test will be explained later. When a series of test steps have ended, the access point control unit 110 reports a test result to the maintenance terminal 131, and the maintenance terminal 131 displays the reported result on a screen by way of example. The normalcy test of the radio access point 104 is ended by the above flow.

Figure 2:
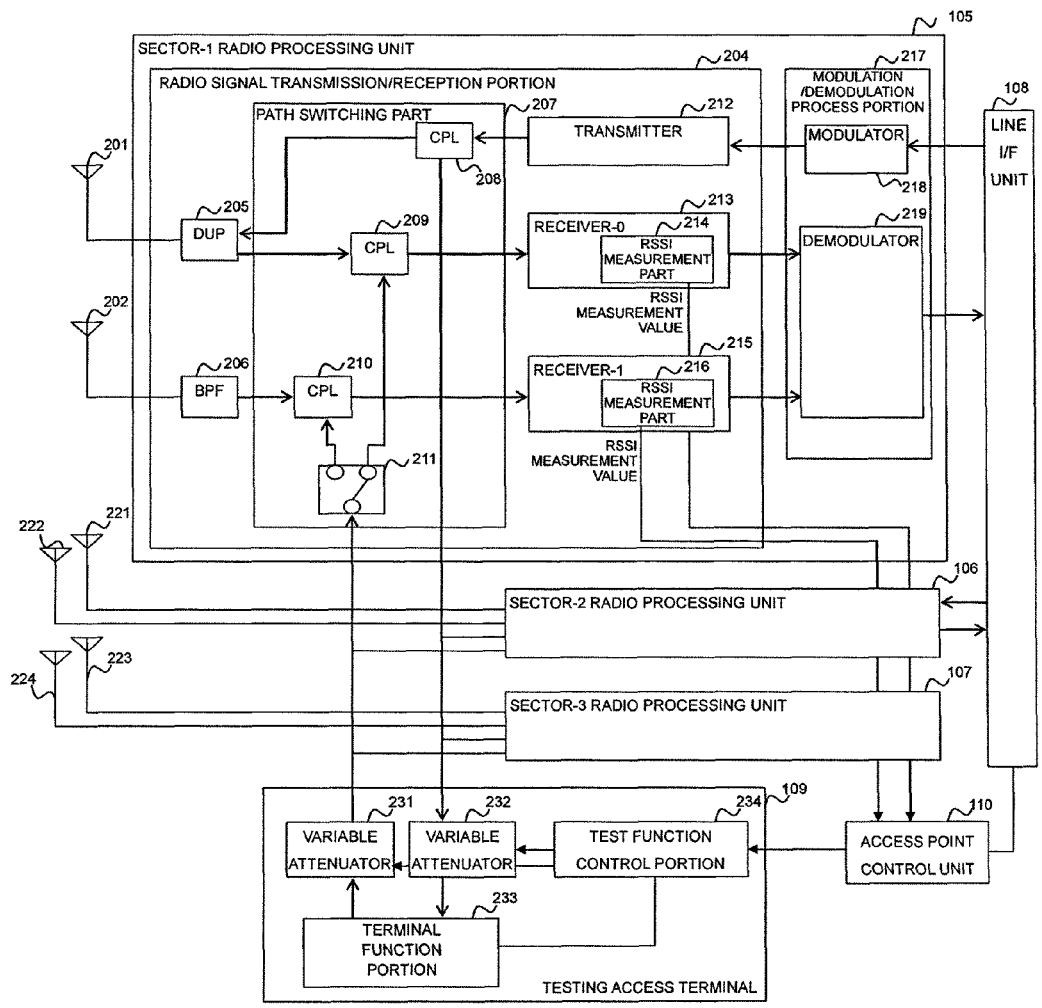
FIG. 2 is a block arrangement diagram (#1) of a radio access point in the case of performing the reception characteristic diagnosis of the loop-0 of a sector-1 in an embodiment of the invention.

FIG. 2 is a detailed configurational diagram of the access point 104.

The sector-1 radio processing unit 105 of the access point 104 includes a radio signal transmission/reception portion 204 and a modulation/demodulation process portion 217, and a loop-0 antenna 201 for both transmission and reception and a loop-1 antenna 202 for reception, for example, are connected to this radio processing unit 105. The radio signal transmission/reception portion 204 includes a path switching part 207 for switching transmission/reception paths, and a transmitter 212 of one loop and receivers of two loops (receiver-0 213 and receiver-1 215). Further, the radio signal transmission/reception portion 204 includes a DUP (duplexer) 205 which separates a reverse radio signal and a forward radio signal, and a BPF (band-pass filter) 206 which limits the pass band of the forward radio signal. Incidentally, the number of the sectors is not limited to three, but one sector or any other appropriate number of sectors may well be disposed. Besides, the receivers and the transmitter may well have any other appropriate numbers of loops.

The transmitter 212 converts a reverse baseband signal inputted from a modulator 218, into the reverse radio signal. The receiver-0 213 receives the forward radio signal transmitted from the access terminal, through the DUP 205, and it converts the received radio signal into a forward baseband signal. The receiver-1 215 receives the forward radio signal transmitted from the access terminal, through the BPF 206, and it converts the received radio signal into the forward baseband signal. The receiver-0 213 and receiver-1 215 include RSSI measurement parts 214 and 216 for measuring the RSSIs of the received signals, respectively. Incidentally, since the configuration of each of the sector-2 radio processing unit 106 and sector-3 radio processing unit 107 can be made identical to the configuration of the sector-1 radio processing unit 105, it shall be omitted from description.

The modulation/demodulation process portion 217 includes the modulator 218 and a demodulator 219, and it modulates and demodulates data. The line interface unit 108 is the interface between the radio access point 104 and the center point 120. The access point control unit 110 has the functions of monitoring and controlling the radio access point 104.

The testing access terminal 109 includes, for example, a terminal function portion 233, a test function control portion 234, a variable attenuator 231 for a forward path, and a variable attenuator 232 for a reverse path. The terminal function portion 233 is a testing terminal which has, for example, functions equivalent to those of an access terminal that is used by a general user. By way of example, the terminal function portion 233 includes a transmitter and a receiver. The test function control portion 234 has the function of controlling the terminal function portion 233. By the way, in FIG. 2, the testing access terminal 109 may well include a switch for switching connection to the sector to-be-tested.

The path switching part 207 includes, for example, a plurality of couplers (CPLs) 208, 209 and 210, and a switch (SW) 211. The CPL 208 connects the transmitter 212, the DUP 205 (or a path to the antenna 201) and the variable attenuator 232 of the reverse path (or a path to the testing access terminal 109) with one another. Besides, the CPL 209 connects the receiver-0 213, the DUP 205 (or the path to the antenna 201) and the SW 211 (or a path to the testing access terminal 109) with one another. The CPL 210 connects the receiver-1 215, the BPF 206 (or a path to the antenna 202) and the SW 211 (or the path to the testing access terminal 109) with one another.

The CPL 208 extracts part of the reverse radio signal, and outputs the extracted part to the testing access terminal 109. Besides, the CPL 209 outputs a forward test signal transmitted from the testing access terminal 109, to the receiver-0 213. The CPL 210 outputs a forward test signal transmitted from the testing access terminal 109, to the receiver-1 215. The SW 211 switches whether the testing access terminal 109 is to be connected to the receiver-0 213 or to the receiver-1 215. This SW 211 can be changed-over by, for example, the access point control unit 110 or the test function control portion 234.

(Normalcy Confirming Test)

The processing of a reception sensitivity measurement test will be explained as an example of a normality confirming test.

When the access point control unit 110 receives from the maintenance terminal 131, a test start instruction which contains the identification information of a sector to-be-tested and/or the identification information of a loop (for example, loop 0 or loop 1), it transmits to the test function control portion 234, a switch changeover instruction which contains the sector identification information and/or the loop identification information. Incidentally, the test start instruction may well contain test sort information which indicates the reception sensitivity measurement test. The test function control portion 234 receives the switch changeover instruction, and it sets the SW 211 and the appropriate switches so that the sector and/or the loop thereof, corresponding to the sector identification information and/or loop identification information contained in the instruction, may be connected with the terminal function portion 233. Besides, the test function control portion 234 controls power attenuation magnitudes in the forward-path variable attenuator 231 and reverse-path variable attenuator 232 so as to simulate the environment of the terminal function portion 233. By way of example, when the attenuation magnitudes are made large, it can be simulated that the terminal function portion 233 lies at a far position from the access point 104. The terminal function portion 233 establishes a calling connection state with a predetermined device (for example, the test server 133) through, for example, the radio processing unit 105, and it transmits packets to the predetermined device.

The access point control unit 110 evaluates a packet error rate (PER) in such a way that the number of error packets counted by the radio signal transmission/reception portion 204 (signal processing portion) is divided by the total number of received packets. Subsequently, the access point control unit 110 instructs the test function control portion 234 to alter transmission power in accordance with the measured packet error rate. By way of example, when the packet error rate is high, the instruction is given so as to raise the transmission power. On the other hand, when the packet error rate is low, the instruction is given so as to lower the transmission power. In compliance with the instruction from the access point control unit 110, the test function control portion 234 alters the transmission power from the terminal function portion 233. Subsequently, the test function control portion 234 transmits a transmission power value P1 after the alteration, to the access point control unit 110. The access point control unit 110 receives the transmission power value P1, and stores it in a storage portion.

The access point control unit 110 evaluates the packet error rate again. This access point control unit 110 judges if the evaluated packet error rate falls within a predetermined range. It repeats the instruction of the alteration of the transmission power, to the test function control portion 234, the reception of the transmission power value P1 from the test function control portion 234, and the storage of the transmission power value P1 until the packet error rate falls within the predetermined range.

The access point control unit 110 calculates a reception sensitivity on the basis of the transmission power value P1 at the time when the packet error rate lies within the predetermined range. By way of example, the reception sensitivity may well be evaluated in such a way that a predetermined path loss value from the terminal function portion 233 to the reception part 213 or 215 is read out of the storage portion, and that the path loss value is subtracted from the transmission power value P1. Alternatively, as will be explained later, the reception sensitivity may well be evaluated on the basis of the transmission power value P1 and the RSSI. The access point control unit 110 transmits to the maintenance device 131, a test result which contains the calculated reception sensitivity and/or a failure decision result based on the reception sensitivity.

Incidentally, an appropriate test different from the above processing may well be performed as the normalcy confirming test. It is also allowed to employ a sequence which is disclosed in FIG. 8 of JP-A-2005-151189 (Patent Document 2).

(Operation)

The first means for solving the first problem will be concretely described with reference to FIG. 2.

Now, operations in the case where the test of the radio access point 104 is performed under an environment in which external noise exists will be described along the configuration shown in FIG. 2. When the external noise is received by the antennas 201 and 202 of the radio access point 104, its noise power is inputted to the receiver-0 213 through the duplexer (DUP) 205 and coupler (CPL) 209 in the case of the loop-0 antenna 201, and it is inputted to the receiver-1 215 through the band-pass filter (BPF) 206 and coupler (CPL) 210 in the case of the loop-1 antenna 202. The receiver-0 213 and receiver-1 215 are monitoring the values of RSSIs in the corresponding reception loops by the respective RSSI measurement parts 214 and 216, and they report the values to the access point control unit 110.

Upon receiving the instruction of the performance of the normalcy test of the radio access point 104 from the maintenance terminal 131, the access point control unit 110 confirms the RSSI measurement value (X) reported from the RSSI measurement part 214 or 216, and it decides whether or not the value (X) exceeds a preset threshold value.

In a case, for example, where the measured RSSI exceeds the threshold value on account of the rise of the RSSI under the influence of the external noise or the like, the access point control unit 110 calculates the difference $\Delta$ (dB)=X (dBm)−N (dBm) between the RSSI measurement value (X) and thermal noise power (N) in the nonexistence of the external noise. Incidentally, the thermal noise power (N) in the nonexistence of the external noise can be set beforehand. Besides, the thermal noise power may well be measured and stored beforehand by, for example, connecting a terminator instead of the antenna before the operation. The access point control unit 110 notifies the difference $\Delta$ (dB) to the test function control portion 234 as the rise of the RSSI. The test function control portion 234 increases an attenuation magnitude in such a way that the value $\Delta$ notified by the access point control unit 110 is added to a steady-state set value of the variable attenuator 232 for adjusting the path loss of the reverse link.

The subsequent processing is the same as in the normalcy confirming test stated before. In case of originating (calling connection) from the terminal function portion 233, the reception power of the reverse link decreases due to the increase of the path loss. In view of Formula (1) mentioned before, therefore, initial transmission power in the case where the terminal function portion 233 originates rises by the decrease in the reception power of the reverse link. In the case, for example, where the RSSI has risen under the influence of the external noise, the calling connection can be performed.

Also, the first resolution means for the second problem can be elucidated by employing the configuration in FIG. 2.

Figure 4:
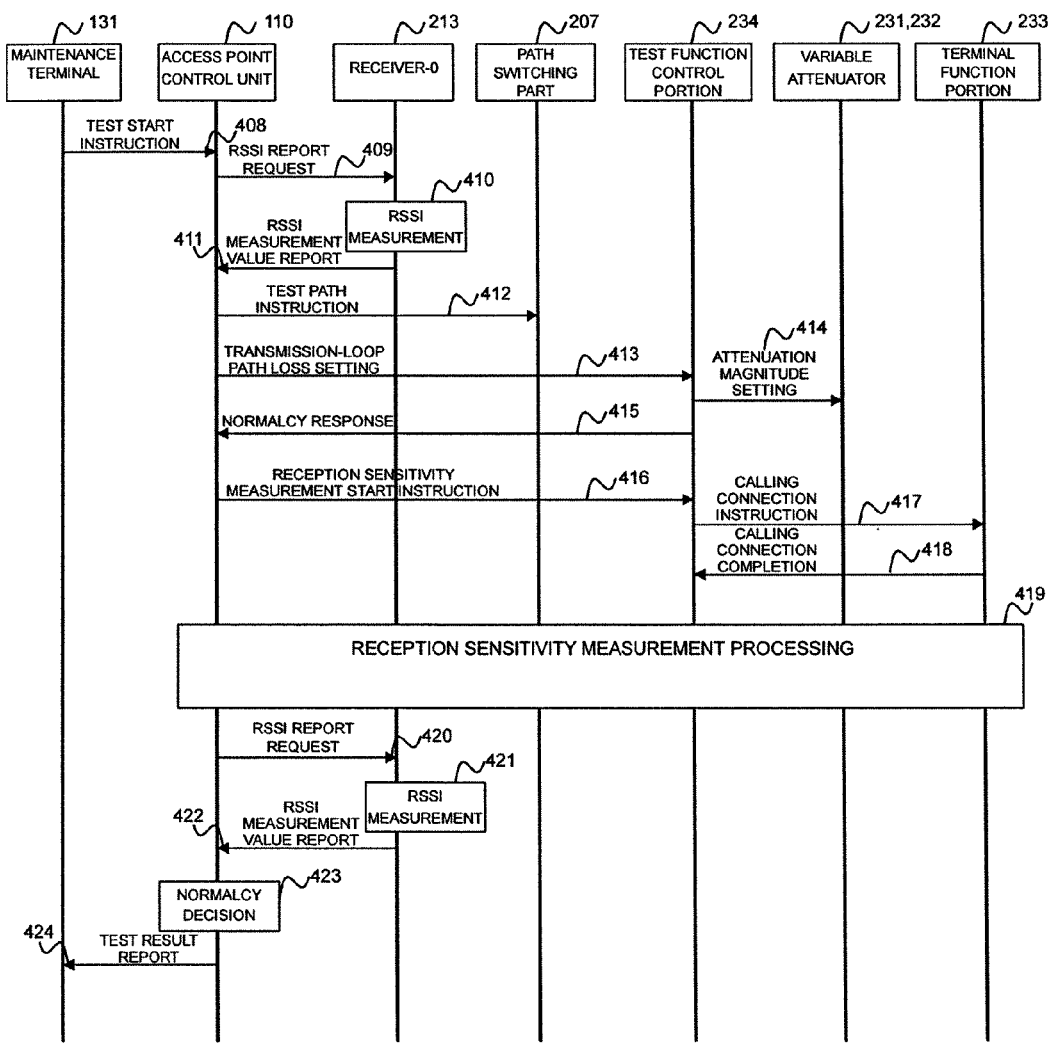
FIG. 4 is a diagram for explaining a test sequence in the case of performing the reception characteristic diagnosis of the loop-0 in an embodiment of the invention.

FIG. 4 shows the procedure of a radio characteristic test in the first means for solving the first problem, and the first means for solving the second problem. Now, a test sequence in the case of confirming the normalcy of the receiver-0 of a certain sector will be described in conjunction with FIG. 4.

First of all, a test start instruction is transmitted from the maintenance terminal 131 to the access point control unit 110 (step 408). The test start instruction can contain, for example, the identification information of the sector and the identification information of the loop (here, the loop 0). Subsequent steps can be executed for, for example, the designated sector. Upon receiving the test start instruction, the access point control unit 110 first sends an RSSI report request to the receiver-0 213 in order to confirm the newest RSSI value (step 409). The receiver-0 213 measures the newest RSSI value with, for example, the reception of an RSSI measurement instruction as an opportunity (step 410), and it reports an RSSI measurement value to the access point control unit 110 (step 411). The access point control unit 110 decides whether or not the reported value of the RSSI exceeds the threshold value. When the threshold value is exceeded, the access point control unit 110 evaluates the difference $\Delta$ (dB) from the thermal noise power in the state where the external noise is nonexistent.

Subsequently, in order to test the receiver-0 213, the access point control unit 110 instructs the path switching part 207 to change-over a path so as to input a test signal from the testing access terminal 109 to the receiver-0 213 (step 412). The path switching part 207 sets the path to the receiver-0 213. By way of example, it connects the SW 211 to the receiver-0 side thereof. The access point control unit 110 notifies the difference $\Delta$ (dB) evaluated above, to the test function control portion 234 (step 413). That is, it notifies that the RSSI is higher than in a steady state in correspondence with the difference $\Delta$. The test function control portion 234 instructs the variable attenuator 232 inserted in the reverse link, to raise the set value of the attenuation magnitude by the difference $\Delta$ (dB) (step 414), and it reports to the access point control unit 110, to the effect that the attenuation magnitude has been normally set (step 415).

Thus, processing for compensating the influence of the external noise is completed. Therefore, the access point control unit 110 instructs the test function control portion 234 to perform a reception sensitivity measurement (step 416). The test function control portion 234 instructs the terminal function portion 233 to perform a calling connection, and it performs the reception sensitivity measurement test after the completion of the calling connection. By way of example, a test signal is sent from the terminal function portion 233 in compliance with an instruction from the access point control unit 110, and a PER is measured by the demodulator 219 within the modulation/demodulation process portion 217 so as to check whether or not the PER is a value within a desired range. In a case where the PER does not fall within the desired range, the transmission power of the terminal function portion 233 is adjusted, and the PER measurement is performed again. The access point control unit 110 repeats this processing until the PER falls within the desired range. Incidentally, the details of the procedure of the reception sensitivity measurement test is as stated before. The repeated processing of the reception of the test start instruction, the switch changeover, the calling connection, etc. may well be appropriately omitted. The transmission power of the terminal function portion 233 satisfying the desired forward-link PER (Packet Error Rate) is evaluated by the series of operations.

Thereafter, the access point control unit 110 requests the receiver-0 213 to report the measurement value of the RSSI again (step 420). The receiver-0 213 performs the measurement of the RSSI (step 421), and it reports the RSSI measurement value to the access point control unit 402 (step 422). The access point control unit 110 compares the RSSI value measured before the performance of the test and the RSSI value measured after the end of the test, and it confirms that a fluctuating width is within an error range. In a case where the RSSI measurement values before and after the performance of the test are greatly different, the external noise might have greatly fluctuated during the test. Therefore, a test result at this time can be discarded by judging it as data of low reliability. In order to enhance a measurement accuracy, the measurement processing for the RSSI may well be executed, not only before and after the performance of the test, but also during the test frequently.

When it has been judged that the fluctuation of the RSSI is small, the access point control unit 110 subsequently judges the normalcy of the radio access point 104 in conformity with the following formula (step 423):

Signal quality=(Transmission power (dBm) of Terminal function portion−Path loss (dB))−RSSI measurement value (dBm)<Decision threshold value (3)

Here, the "transmission power of the terminal function portion" in Formula (3) is transmission power at the transmission port end of the terminal function portion 233. Besides, the "path loss" is the difference between the path losses of the transmission port end of the terminal function portion 233—the output end of the coupler 209 and the end of the radio-access-point antenna port 201—the output end of the coupler 209 in FIG. 2. That is, a value obtained by subtracting the "path loss" from the "transmission power of the terminal function portion" becomes a value obtained by converting the transmission power from the terminal function portion 233, into reception power at the antenna end of the radio access point.

The "signal quality" satisfying the desired PER is evaluated by the difference between the calculated signal power at the antenna port end and the RSSI value. This signal quality is compared with the preset "decision threshold value", whereby the normalcy is judged. By way of example, the access point control unit 110 can judge the normalcy of the radio access point in a case where the evaluated difference is smaller than the preset threshold value, whereas it can judge the abnormalcy of the radio access point in a case where the evaluated difference is not smaller than the preset threshold value.

2. Second Embodiment

Figure 3:
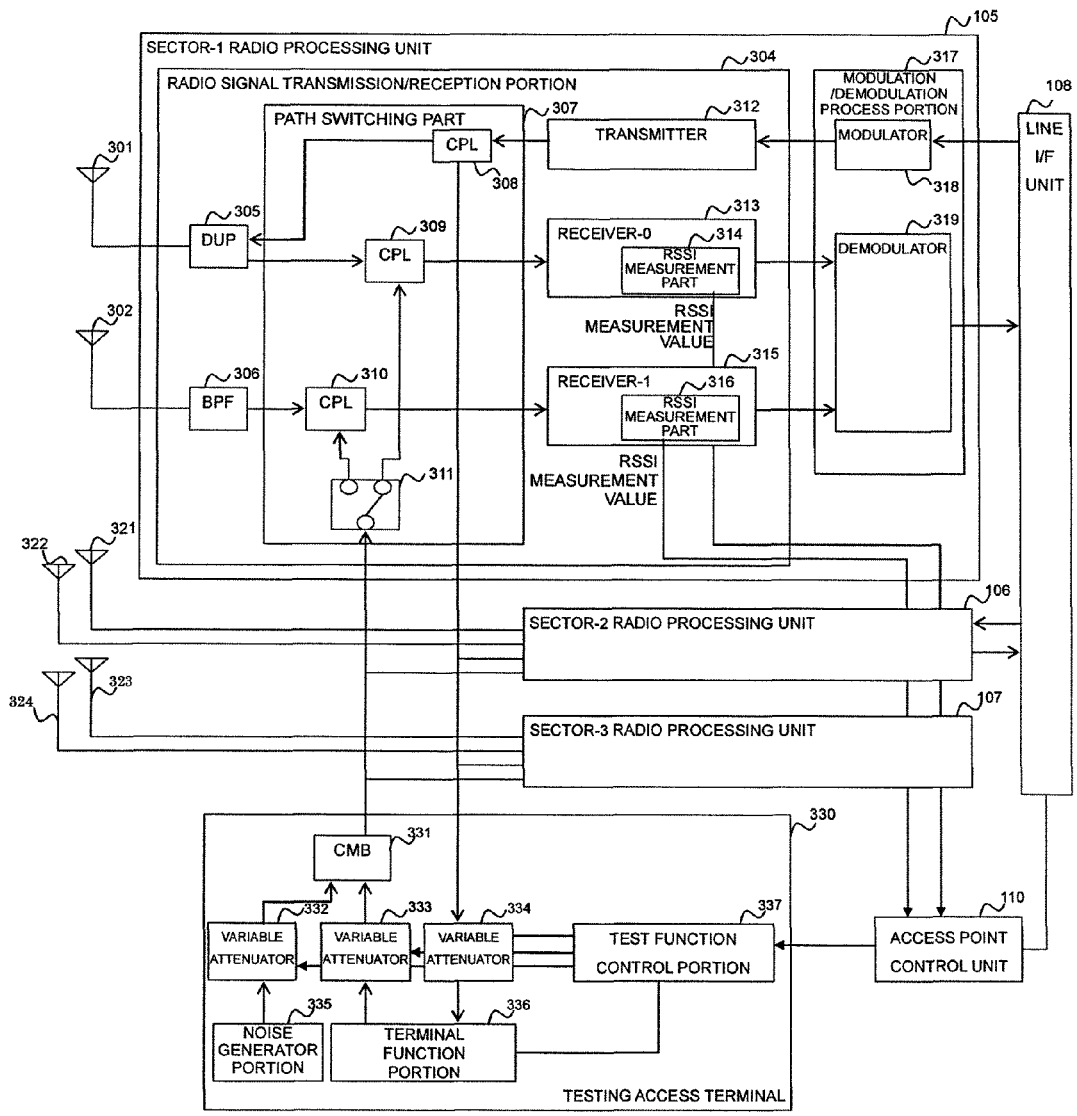
FIG. 3 is a block arrangement diagram (#2) of a radio access point in the case of performing the reception characteristic diagnosis of the loop-0 of a sector-1 in an embodiment of the invention.

FIG. 3 shows the configuration of the second resolution means for the second problem. In this embodiment, a test is performed using a test signal in which thermal noise, for example, is superposed on the test signal itself, and which is set at a signal quality that will satisfy a desired PER or S/N (signal-to-noise ratio). A terminal function portion has its transmission power raised by superposing the thermal noise, in order to control the transmission power so that the S/N, for example, may become constant.

In the first embodiment, the noise component in the case of evaluating the signal quality of the test signal is predominated by the external noise component. Therefore, in a case where the external noise fluctuates temporally, the precision of a measurement result sometimes degrades. In contrast, in the second embodiment, the noise of known level is added as the test signal, and hence, a signal quality can be measured without being influenced by the external noise.

The general configuration of a system is the same as in FIG. 1. A radio access point 104 takes a three-sector configuration in this example, and it includes radio processing units 105-107 corresponding to respective sectors, a line interface (I/F) unit 108, a testing access terminal 330, and an access point control unit 110. The radio processing units 105-107, the line interface (I/F) unit 108 and the access point control unit 110 are the same as in the first embodiment, respectively.

In order to fulfill the function of this means, the testing access terminal 330 includes a terminal function portion 336, a test function control portion 337, a variable attenuator 333 for a forward path, and a variable attenuator 334 for a reverse path. Further, it includes a noise generation portion 335, a variable attenuator (second attenuator) 332 for adjusting the level of the noise, and a combiner (CMB) 331. The terminal function portion 336, the test function control portion 337, the variable attenuator 333 for the forward path, the variable attenuator 334 for the reverse path are the same as the corresponding portions of the first embodiment, respectively.

The adjustment of the signal quality of the test signal is performed by the settings of the variable attenuators 332 and 333. In case of confirming the normalcy of a receiver-0 313, the access point control unit 110 first acquires the measurement value of an RSSI value based on this receiver-0, prior to the performance of the test. With the configuration in FIG. 3, in a case where the RSSI measurement value is higher than a threshold value, a difference Δ from a value in a steady state is given as the increase given to the variable attenuator 334 of the reverse link, and it is also set as the decrease given to the variable attenuators 332 and 333 of the forward link. That is, in the case where the RSSI measurement value is high under the influence of the external noise, the attenuation magnitude of the forward link is decreased, and transmission power from the testing terminal is raised. The test signal is set at a power level which is sufficiently high relative to the RSSI value of the forward link. Thus, the influence of the external noise can be avoided. The test signal itself is combined by the CMB 331 with a noise component generated by the noise generation portion 335, and is thereafter fed to the radio processing unit 105.

According to this embodiment, the noise component of sufficiently high level is fed as the test signal, so that the PER measurement of the test signal can be performed without being influenced by the external noise. Besides, in a case where the abnormalcy of an apparatus side has taken place, the degradation of the signal quality of the test signal occurs. Therefore, in a case where the PER of the forward link is measured on the basis of the test signal by a modulation/demodulation process portion 317 and where a desired PER is satisfied, it can be judged that a radio characteristic is normal. In contrast, in a case where the PER measured by the modulation/demodulation process portion 317 does not satisfy the desired PER, it can be judged that any abnormalcy is involved in the radio access point apparatus.

3. Modification to First Embodiment

As the other means (second means) for solving the first problem, the access terminal of a general user calculates the initial transmission power by Formula (1) mentioned before, whereas the initial transmission power of the testing access terminal 109 is not evaluated by Formula (1), but it is given as a fixed value which is the optimum value evaluated from the path loss between the radio access point 104 and the testing access terminal 109. Since the path loss between the testing access terminal 109 and the radio access point 104 does not change with time, this means can be adopted. Besides, on this occasion, in a case where the RSSI (X) of the forward link has risen to exceed a threshold value, on account of the external noise or the like, the initial transmission power (Xo) given as the fixed value is raised by an offset component ($\Delta X$) corresponding to the rise of the RSSI of the forward link (to Xo+$\Delta X$), whereby the initial transmission power is adjusted. Likewise to the first means explained before, the radio wave of the testing access terminal can be caused to reach the radio access point, against the influence of the external noise, and the calling connection can be performed. Incidentally, the remaining configuration and processing can be made the same as in the first embodiment by way of example.

4. Appendix

While the first to third embodiments have been described above, the individual embodiments may well be combined, or parts of the individual embodiments may well be combined in such a manner that the third embodiment is employed for the calling connection in the first embodiment.

According to the present invention, the reception characteristic of a radio access point can be measured at a high precision, remotely and on-line fashion without incurring a service interruption and without being influenced by external noise. Besides, in a case where a desired characteristic has not been attained, a defective part can be specified.

The invention is applicable to, for example, an industry which concerns a communication system for radio communications, and an industry which provides a communication service by employing the communication system.

What is claimed is:

1. A radio access point testing apparatus, comprising a plurality of radio processing units, a testing access terminal and a control unit,
   the testing access terminal including:
   a terminal function portion which has a transmission function and a reception function of a communication terminal in a radio communication system, and in which an initial transmission power from the terminal function portion in case of performing a calling connection is determined in accordance with reception power; and
   a test function control portion which causes said terminal function portion to perform a calling connection through said radio processing unit, so as to test normalcy and abnormalcy of a radio access point,
      each radio processing unit including a transmitter for transmitting signals to said terminal function portion and the communication terminal, and a receiver for receiving signals from said terminal function portion and the communication terminal,
   wherein said radio access point testing apparatus further comprises:
   a reception power measurement part for measuring reception power in said receiver including power of a radio signal from the communication terminal and/or interference waves in said radio processing unit; and
   a variable attenuator in said terminal function portion, wherein
   said reception power measurement part is configured to connect with said control unit, to monitor reception power value and to report it to said control unit;
   upon receiving an instruction of a performance of the normalcy test from an upper apparatus, said control unit calculates a difference between the reception power value reported from said reception power measurement part and predetermined thermal noise power in the non-existence of the external noise, and reports the difference to said test function control portion;
   said test function control portion controls the initial transmission power of said terminal function portion by adjusting an attenuation magnitude of said variable attenuator based on reported difference;
      said terminal function portion performs the calling connection with the predetermined device by the controlled initial transmission power; and
      said control unit performs the test of the radio access point.

2. A radio access point testing apparatus, comprising a plurality of radio processing units, a testing access terminal and a control unit,
   the testing access terminal including:
   a terminal function portion which has a transmission function and a reception function of a communication terminal in a radio communication system; and
   a test function control portion which causes said terminal function portion to perform a calling connection through said radio processing unit, so as to test normalcy and abnormalcy of a radio access point,
      each radio processing unit including a transmitter for transmitting signals to said terminal function portion and the communication terminal, and a receiver for receiving signals from said terminal function portion and the communication terminal;
   wherein said radio access point testing apparatus further comprises:
   a reception power measurement part for measuring reception power in said receiver including a power of the radio signal from the communication terminal and/or interference waves in said radio processing unit, wherein
   said reception power measurement part is configured to connect with said control unit, to monitor reception power value and to report it to said control unit;
   an initial transmission power of said terminal function portion in a case of performing a calling connection is previously set to a fixed value based on a path loss between said radio processing unit and said terminal function portion;
   upon receiving an instruction of a performance of the normalcy test from an upper apparatus, said control unit calculates a difference between the reception power value reported from said reception power measurement part and predetermined thermal noise power in the non-existence of the external noise, and reports the difference as a rise value of the reception power to said test function control portion;
      said test function control portion controls the initial transmission power of said terminal function portion by adding an offset in accordance with the rise value of the reception power measured and reported by said reception power measurement part to the fixed value of the initial transmission power which is previously set;

said terminal function portion performs the calling connection with the predetermined device by the controlled initial transmission power; and said control unit performs the test of the radio access point.

3. A radio access point testing apparatus as defined in claim 1, wherein said control unit evaluates a difference between the value of the reception power measured by said measurement part and the transmission power of said terminal function portion adjusted so as to satisfy a desired packet error rate in said radio processing unit, and compares the evaluated difference and a predetermined threshold value, thereby to judge the normalcy and abnormalcy of the radio access point.

4. A radio access point testing apparatus as defined in claim 3, wherein said control unit evaluates the difference by using a value obtained by converting the transmission power into power of an antenna end of the radio access point.

5. A radio access point testing apparatus as defined in claim 3, wherein said control unit judges that the radio access point is normal, in a case where the evaluated difference is smaller than the predetermined threshold value, and judges that the radio access point is abnormal, in a case where the evaluated difference is not smaller than the predetermined threshold value.

6. A radio access point testing apparatus as defined in claim 2, wherein said control unit evaluates a difference between the value of the reception power measured by said measurement part and the transmission power of said terminal function portion adjusted so as to satisfy a desired packet error rate in said radio processing unit, and compares the evaluated difference and a predetermined threshold value, thereby to judge the normalcy and abnormalcy of the radio access point.

7. A radio access point testing apparatus as defined in claim 6, wherein said control unit evaluates the difference by using a value obtained by converting the transmission power into power of an antenna end of the radio access point.

8. A radio access point testing apparatus as defined in claim 6, wherein said control unit judges that the radio access point is normal, in a case where the evaluated difference is smaller than the predetermined threshold value, and judges that the radio access point is abnormal, in a case where the evaluated difference is not smaller than the predetermined threshold value.

9. A radio access point testing apparatus, comprising a plurality of radio processing units, a testing access terminal and a control unit, the testing access terminal including:

a terminal function portion which has a transmission function and a reception function of a communication terminal in a radio communication system; and a test function control portion which causes said terminal function portion to perform a calling connection through said radio processing unit, so as to test normalcy and abnormalcy of a radio access point, each radio processing unit including a transmitter for transmitting signals to said terminal function portion and the communication terminal, and a receiver for receiving signals from said terminal function portion and the communication terminal;

wherein said radio access point testing apparatus further comprises a reception power measurement part for measuring reception power in said receiver including a power of the radio signal from the communication terminal and/or interference waves in the radio processing unit, wherein said reception power measurement part is configured to connect with said control unit, to monitor reception power value and to report it to said test function control portion;

said reception power measurement part measures the reception power more than once before and after the performing the test or during the test; and said test function control portion compares measurement results, if a fluctuating width of the measurement results is within an error range which is set beforehand and corresponds to a state of the nonexistence of the external noise, said test function control portion:

obtains a difference between a value of the reception power measured by said reception power measurement part and transmission power of said terminal function portion adjusted so as to satisfy a desired packet error rate in said radio processing unit; and compares the obtained difference and a predetermined threshold value, thereby to judge the normalcy of the radio access point.

\* \* \* \* \*